(12) United States Patent
Kimpel

(10) Patent No.: US 6,588,729 B1
(45) Date of Patent: Jul. 8, 2003

(54) PACKING BOX ARRANGEMENT FOR A GATE VALVE

(75) Inventor: Alvin A. Kimpel, Edgerton, WI (US)

(73) Assignee: Weir Slurry Group, Inc., Madison, WI (US)

( * ) Notice: Subject to any disclaimer, the term of this patent is extended or adjusted under 35 U.S.C. 154(b) by 7 days.

(21) Appl. No.: 10/045,598

(22) Filed: Oct. 18, 2001

(51) Int. Cl.[7] ................................................ F16K 3/16
(52) U.S. Cl. ...................... 251/214; 251/328; 277/523
(58) Field of Search ................................ 251/326, 327, 251/328, 329, 214; 277/520, 523, 522

(56) References Cited

U.S. PATENT DOCUMENTS

| | | | |
|---|---|---|---|
| 3,000,608 A | | 9/1961 | Williams |
| 3,254,873 A | * | 6/1966 | Knox .......................... 251/328 |
| 3,429,555 A | * | 2/1969 | Wrenshall ................... 251/214 |
| 3,446,476 A | * | 5/1969 | Scaramucci ................. 251/329 |
| 3,710,816 A | | 1/1973 | Prince |
| 4,646,407 A | | 3/1987 | Mayhew, Jr. |
| 4,745,944 A | * | 5/1988 | Francart, Jr. ................ 251/214 |
| 4,911,408 A | * | 3/1990 | Kemp .......................... 251/214 |
| 5,014,730 A | * | 5/1991 | Fye .............................. 251/329 |
| 5,082,247 A | | 1/1992 | Owens et al. |
| 5,137,261 A | | 8/1992 | Clifford |
| 5,154,397 A | * | 10/1992 | Thomas et al. .............. 251/328 |
| 5,201,872 A | * | 4/1993 | Dyer ............................ 251/328 |
| 5,205,317 A | | 4/1993 | Neuerberg et al. |
| 5,292,105 A | | 3/1994 | Velimirovic |
| 5,413,140 A | | 5/1995 | Kimpel et al. |
| 5,582,200 A | | 12/1996 | Kimpel et al. |

* cited by examiner

Primary Examiner—Paul J. Hirsch
(74) Attorney, Agent, or Firm—Morriss O'Bryant Compagni, P.C.

(57) ABSTRACT

A packing system for a gate valve is disclosed which includes a sealing member structured to be positioned between a compression member and packing material housed in a cavity formed in the upper edge of a valve housing to provide even and consistent pressure of the packing material against the gate of the valve, thereby preventing leakage from about the gate of the valve. The packing may also include a gasket between the compression member and sealing member to provide additional sealing assurance.

12 Claims, 4 Drawing Sheets

PACKING BOX ARRANGEMENT FOR A GATE VALVE

BACKGROUND OF THE INVENTION

1. Field of the Invention

This invention relates to industrial valves and more specifically relates to an improved packing assembly for use in gate valves to attenuate leakage about the gate.

2. Description of the Related Art

Gate valves are used in many industrial applications to selectively modify the flow rate of fluid through a pipe into which the gate valve is incorporated. Gate valves generally comprise a valve body having an opening the diameter of which approximates the diameter of the pipe into which the valve is incorporated, a valve seat associated with the opening and a solid gate plate which is vertically slidable within the valve body to selectively occlude the opening to control the flow of fluid through the pipe. The solid plate of the gate is typically structured with or attached to a valve stem or tubular spindle which is actuated in some manner, such as manually or electromechanically, to raise and lower the gate within the valve body. The particular construction and design of gate valves varies widely among manufacturers.

Most gate valves are specifically designed and constructed to provide sealing mechanisms which seal the valve body as completely as possible against fluid leaks. Complete sealing is particularly necessary when such valves are employed in industrial applications where toxic or otherwise environmentally harmful fluids are being processed. The primary focus of leakage is between the gate, the valve seat and the housing. A second area of concern for leakage is between the housing and the slidable gate, or the valve stem which operates to raise and lower the gate. Recognizing the need to seal the valve stem from leakage in many valve types, including gate valves, the patent literature is replete with patents which disclose packing or stuffing systems for valve stems.

Another area of concern, and that which is relevant to the present invention, is the prevention of leakage about the gate plate itself. Many gate valves have been designed to include a packing mechanism or system which encircles or extends about the gate to seal the flat surfaces and ends of the gate against leakage. Examples of such gate valve constructions are disclosed in U.S. Pat. No. 3,000,608 to Williams; U.S. Pat. No. 3,710,816 to Prince; U.S. Pat. No. 4,646,407 to Mayhew; U.S. Pat. No. 5,082,247 to Owens, et al.; U.S. Pat. No. 5,137,261 to Clifford; U.S. Pat. No. 5,205,317 to Neuerberg, et al.; U.S. Pat. No. 5,292,105 to Velimirovic; and U.S. Pat. No. 5,582,200 to Kimpel, et al.

Some of the gate valve constructions disclosed in the patent literature, for example U.S. Pat. No. 4,646,407 and U.S. Pat. No. 5,205,317, merely comprise the formation of a packing cavity in the valve housing into which an amount of packing material, such as braiding, is positionable. Other gate valves are constructed with a cavity formed into the upper surface of the valve housing into which an amount of braided packing material is positioned. The packing material is then compressed into the cavity and against the gate plate by means of a compression device or gland that also encircles the gate. Examples of such constructions are disclosed in U.S. Pat. No. 3,710,816; U.S. Pat. No. 5,082,247; U.S. Pat. No. 5,137,261 and U.S. Pat. No. 5,582,200. Both U.S. Pat. No. 3,000,608 and U.S. Pat. No. 5,292,105 disclose an arrangement where a packing box is provided for positioning above the top edge of the housing.

One inherent problem with known packing systems for gate valves is the fact that as the gate opens and closes over time, the packing loosens or shifts and leakage begins. This problem occurs in known packing systems because they are not structured to and cannot apply even pressure distribution about the surfaces and rounded corners of the gate plate to provide stability to the packing material and thereby prevent leakage. Known packing systems, therefore, last for a relatively short time. Once the packing begins to fail, the compression means or packing gland must be repeatedly tightened to reseal the gate and staunch the leakage. Additionally, there is some resistance among various industries to repeatedly tighten the compression means of the packing system; but certain industries, especially those processing or producing toxic or noxious fluids, are obligated to eliminate fugitive emissions from the system.

Therefore, it would be advantageous in the art to provide a packing system for a gate valve which is structured to provide even distribution of the packing material against the gate valve to avoid leakage about the gate plate and to extend the longevity of the packing system before further adjustment would otherwise be required.

BRIEF SUMMARY OF THE INVENTION

In accordance with the present invention, a packing system for the gate plate of a gate valve is structured to provide even distribution of pressure to the packing material about the gate plate and to provide enhanced means of sealing the packing material from the environment external to the packing system to thereby eliminate leakage about the gate plate.

The packing system of the present invention generally comprises a sealing member which is configured with a slot to receive the gate plate of a valve therethrough. The sealing member is further configured to be positioned along the upper edges of a valve housing having a cavity formed in the top thereof in which packing material is positionable to surround the gate plate. The sealing member is sized and configured to extend over and contact the packing material in the cavity, and to provide an amount of compression to the packing material. The sealing member provides even distribution of compression pressure on the packing material because of its configuration.

The sealing member is further configured to accommodate an o-ring about a peripheral portion of the sealing member to seal the packing material in the cavity of the valve housing from the environment external to the cavity. The sealing member is also configured with a recess positioned about the slot through which the gate valve moves to retain an amount of sealing compound sufficient to seal the gate plate from leakage. The sealing member is preferably made from a non-metallic material which is suitable to provide comprehensive contact with the gate plate to eliminate leakage about the gate. Additionally, the sealing member serves as a guide for movement of the gate and provides support to the gate, thereby taking load and stresses off the packing material.

The packing system further employs a compression member or gland follower which, too, is structured with an elongated slot through which the gate plate moves. The gland follower is sized to extend over the sealing member to hold the sealing member in registration against the packing material. The gland follower is structured to provide selective adjustability to the amount of compression force applied to the sealing member. Thus, the gland follower is secured to an anchoring structure, such as a portion of the valve housing, so that the gland follower may be adjusted as needed. The gland follower may either be bolted to the anchoring structure or may be "live-loaded" through the use of spring-biased bolts.

The packing system of the present invention may further comprise a gasket which is positioned between the gland follower and the sealing member of the packing system. The gasket is configured with a slot through which the gate moves and the gland follower is structured to provide evenly distributed pressure to the gasket to assure a secondary sealing mechanism in the packing system of the present invention.

The configuration of the packing system of the present invention is particularly advantageous because the gate plate remains completely sealed throughout cycling of the valve or, in other words, throughout cycling between an open gate position and a closed gate position. In prior art gate valves, the configuration of the packing arrangement, and/or the machining of the parts, cannot provide complete sealing throughout cycling. These and other advantages of the present invention are illustrated further hereinafter.

BRIEF DESCRIPTION OF THE SEVERAL VIEWS OF THE INVENTION

In the drawings, which illustrate what is currently considered to be the best mode for carrying out the invention:

DETAILED DESCRIPTION OF THE INVENTION

Figure 1:
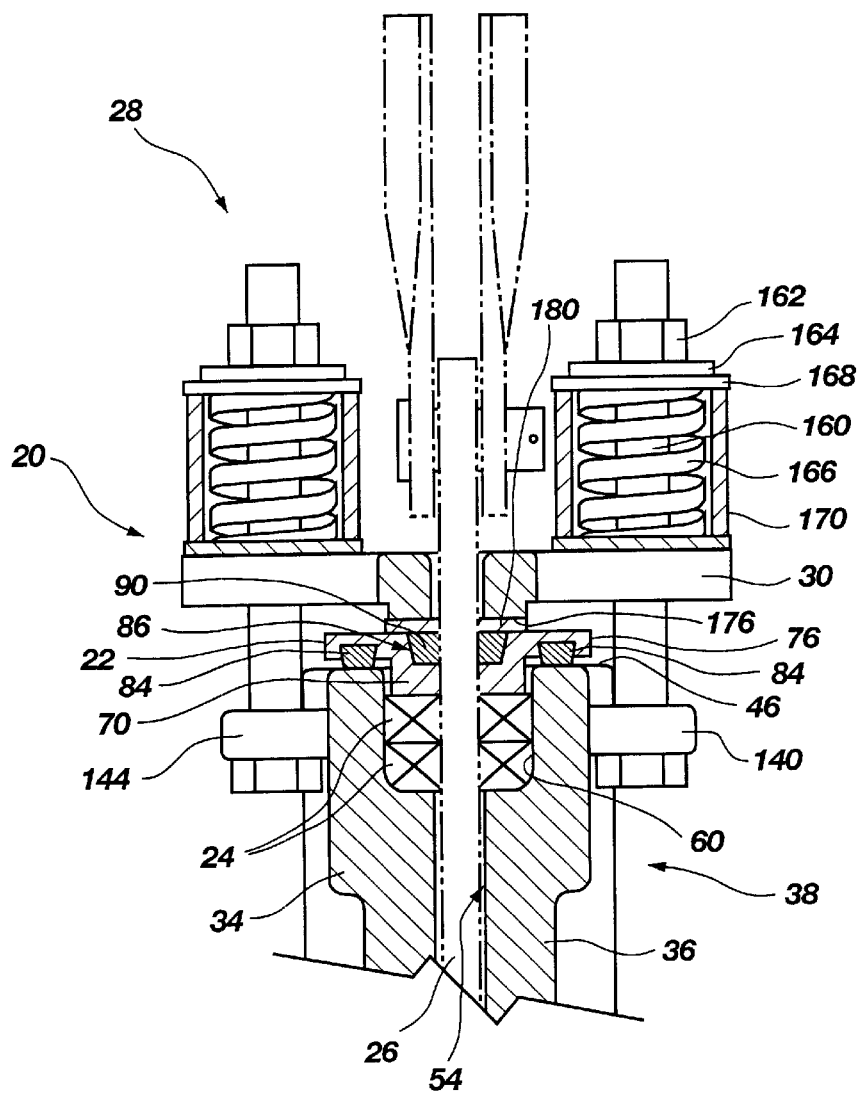
FIG. 1 is a view in cross section of the upper portion of a gate valve illustrating the packing system of the present invention, the gate and gate lifting mechanism being shown in phantom.

The packing system 20 of the present invention, shown in FIG. 1, generally comprises a sealing member 22 which is configured and positioned to apply even and consistent pressure to an amount of packing material 24 in contact with the gate plate 26 of a gate valve, generally at 28. The sealing member 22 achieves even and consistent pressure on the packing material 24 by, in turn, being compressed by means of a compression member, or gland follower 30.

Figure 2:
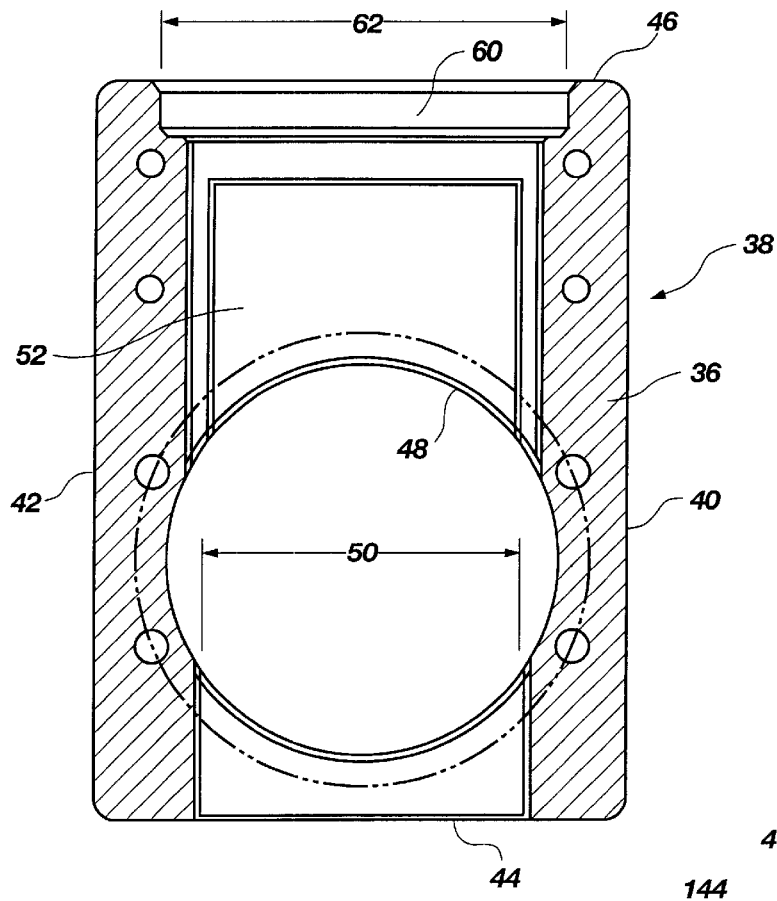
FIG. 2 is a view in elevation of one half of an exemplar valve body illustrating the relative positioning of the packing system to the valve body.
Figure 3:
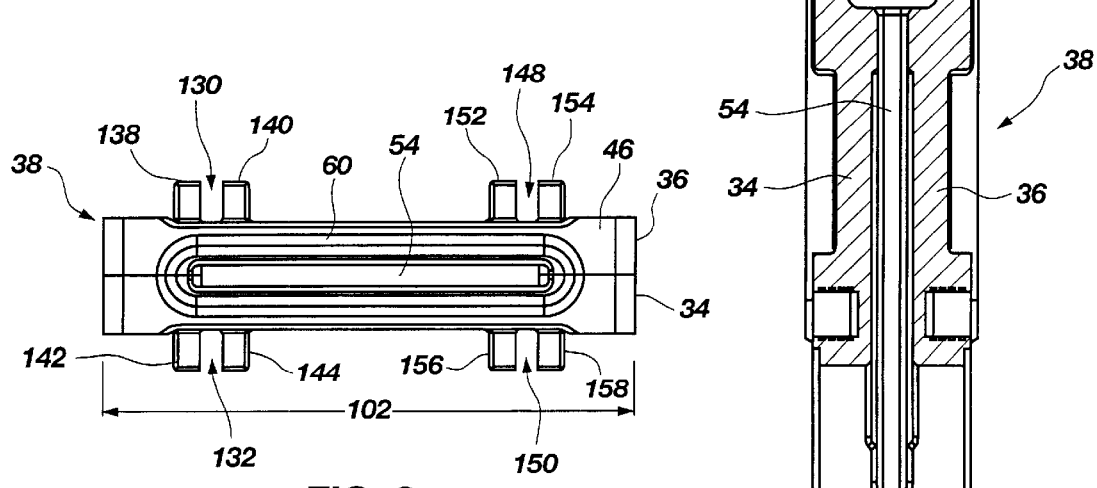
FIG. 3 is a plan view of an exemplar valve body, as shown in FIG. 2, except that the two halves of the valve body are shown in adjacent fixed arrangement to form a complete valve housing.
Figure 4:
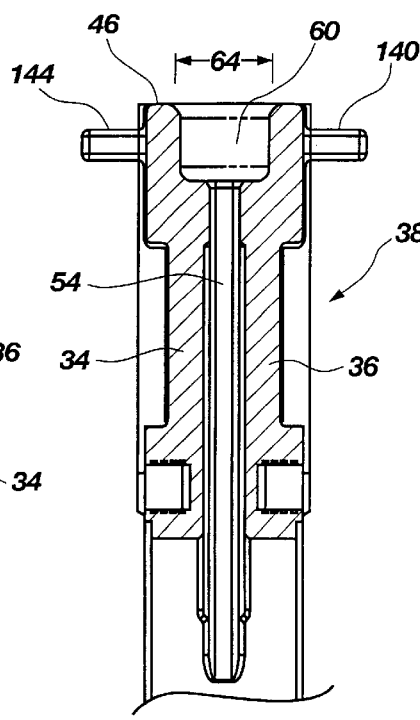
FIG. 4 is a view in cross section of the upper portion of the valve housing illustrated in FIG. 3 showing the position of the cavity provided in the housing for receiving packing material.

More specifically, FIG. 1 shows the upper portion of an exemplar gate valve 28, which generally comprises a first valve body half 34 and a second valve body half 36, the combination of which form a valve housing 38. FIGS. 2–4 more clearly illustrate the features of an exemplar valve housing 38. FIG. 2 illustrates, by way of example, the second valve body half 36 of the valve housing 38, viewed from within the valve housing 38 (i.e., with the first valve body half removed). Each valve body half 36 of the valve housing 38 is configured with opposing long sides 40, 42, a bottom edge 44 and a top edge 46. Each valve body half 36 of the valve housing 38 is structured with an opening 48 that accommodates an elastomer valve sleeve (not shown). It should be noted that FIG. 2 does not illustrate further structures of the valve housing, such as the valve sleeves which are known in the art to surround the opening 48 and provide a primary seal between the gate and opening 48 when the gate is in the closed positioned occluding the opening 48, and it is the internal diameter of the valve sleeves which determine the finished diameter 50 of the opening 48 in the valve housing 38.

Each valve body half 36 of the valve housing 38 is also constructed with an elongated gate recess 52 which is formed parallel to the plane of the valve body half 36 and extends from the top edge 46 to near the bottom edge 44 of each valve body half 36 of the valve housing 38. Thus, when the first valve body half 34 and second valve body half 36 are positioned adjacent each other, as shown in FIG. 4, to form the valve housing 38, a channel 54 is formed in which the gate (not shown in FIG. 4) is slidable between a closed position, where the gate occludes the opening 48, and an open position, where the gate is held in position above the opening 48 to allow flow of fluid therethrough.

It should be noted that although the gate valve described thus far is one which comprises separable halves which are joined to form the valve housing, the present invention is equally employable in a valve housing of the type which is unitarily formed, or one piece, (i.e., lacking separable body halves) or one in which the valve housing comprises a plurality of connected elements which form the entire valve housing. The foregoing description of the essential elements of a gate valve are well-known in the art.

Of particular relevance to the present invention is the formation in or above the valve housing 38 of an elongated cavity, or box 60, which is sized to slidably receive the gate therethrough. In the embodiment shown in FIG. 2, the length 62 of the box 60 is greater than the side-to-side length of the recesses 52 which ultimately form the channel 54 in which the gate slidably moves. As best shown in FIGS. 1 and 4, the width 64 of the illustrated box 60 is greater than that of the channel 54, which is slightly wider than the width of the gate.

Referring again to FIG. 1, it can be seen that the box 60 is sized to receive an amount of packing material 24 therein which effectively surrounds the entire periphery of the gate plate 26 as it slidably moves through the box 60 and channel 54 of the valve housing 38. Any suitable packing material may be used, including those known in the art, such as braided packing material made by W. L. Gore & Associates, Inc. of Elkton, Md.

Figure 5:
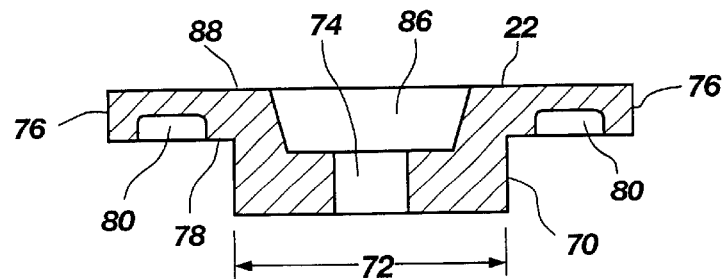
FIG. 5 is a view in cross section of the sealing member shown in FIG. 7 taken at line 5—5 thereof.
Figure 6:
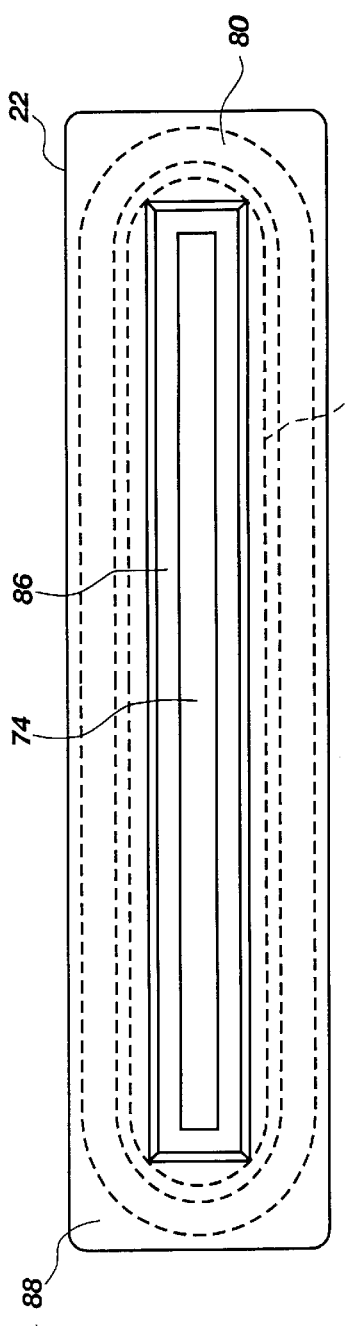
FIG. 6 is a plan view of the surface of the sealing member which is oriented away from the valve body, some features being shown in phantom.
Figure 7:
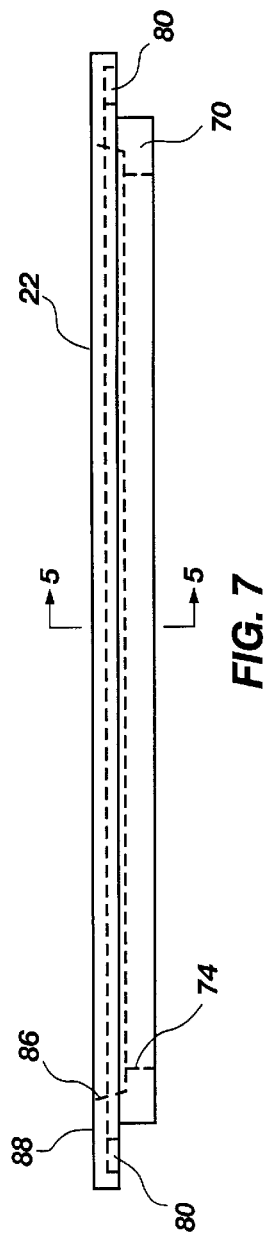
FIG. 7 is a view in elevation of a long side of the sealing member, some features being shown in phantom.
Figure 8:
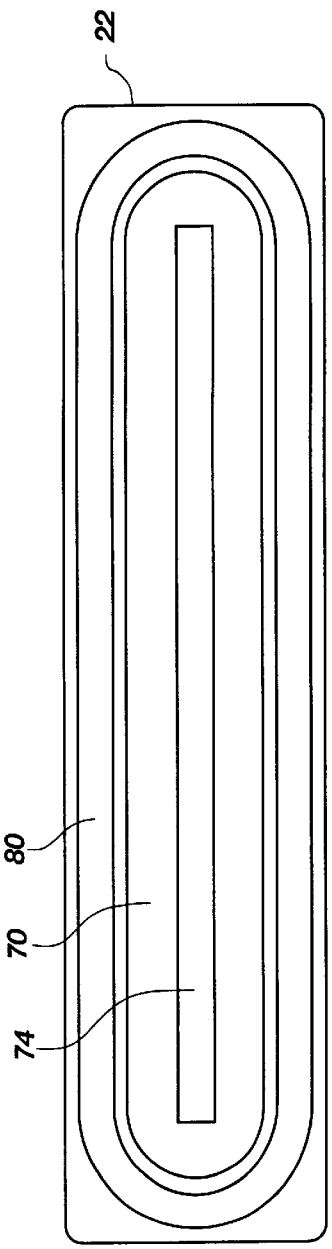
FIG. 8 is a plan view of the surface of the sealing member which is oriented toward the valve housing.

The sealing member 22 of the present invention is structured to be positioned over the packing material 24 to compress it evenly about the gate plate 26 as is moves slidably through the box 60. The sealing member 22, as shown in FIGS. 6 and 8, may be rectangularly shaped about its peripheral dimension to generally approximate the shape of the upper edge 46 of the valve housing 38 (best shown in FIG. 3). The sealing member 22 is configured with a downwardly extending insert 70 the width 72 (FIG. 5) of which is slightly less than the width 64 of the box 60 so that, as shown in FIG. 1, the insert 70 of the sealing member 22 is at least partially receivable within the box 60 in the valve housing 38 to cover the packing material 24. FIGS. 7 and 8 further illustrate that the downwardly extending insert 70 is elongated and shaped to be received within the box 60. The insert 70 is formed with an elongated slot 74 which is sized to snugly and slidably receive the gate plate 26 therethrough.

The sealing member 22 is further configured with a flange portion 76 which extends outwardly from the insert 70. The flange portion 76 is provided with a lower surface 78 which is oriented toward the upper edge 46 of the valve housing 38. A sealing channel 80 is formed in the lower surface 78 of the sealing member 22 to receive an o-ring 84 therein, as shown in FIG. 1. The o-ring 84 provides further sealing between the packing material 24 and the environment external to the box 60 to thereby eliminate leakage or fugitive emissions from about the gate 26 and the box 60.

The sealing member 22 is also configured with a sealing recess 86 which is formed in the upper surface 88 of the sealing member 22 and is continuous with the slot 74 formed through the sealing member 22. The sealing recess 86, as best shown in FIGS. 5 and 6, surrounds the slot 74 formed in the sealing member 22. The sealing recess 86 is provided in the sealing member 22 to receive a sealing compound 90 which essentially fills the recess 86 and contacts the gate 26 to provide a secondary means of sealing the surface of the gate 26 from leakage. Any suitable sealing compound 90 may be used to fill the sealing recess 86, including for example, Tom-Pac TP-5400 sealing compound manufactured by Tom-Pac, Inc. of Montreal, Canada.

The sealing member 22 of the present invention may suitably be made of a non-metallic, ultra-high molecular weight (UHMW) material which allows the sealing member 22 to contact the gate 26 to provide a comprehensive seal with the gate 26 without hindering movement of the gate 26 or degrading the sealing member 22 through repeated and numerous cyclings of the valve. Such material may also be moderately deformable upon compression to allow the insert 70 of sealing member 22 to contact the inner sides of the box 60 to provide sealing thereof, but the material should also be suitably durable to provide compression to the packing material 24 within the box 60.

A gland follower 30 is also provided to contact and compress the sealing member 22 to, in turn, provide an even and consistent compression of the packing material 24 in the box 60. The gland follower 30 may be of any suitable configuration to accomplish the objective. FIGS. 1 and 9–11 show but one exemplar gland follower 30 that may be employed in the packing system of the present invention.

Figure 9:
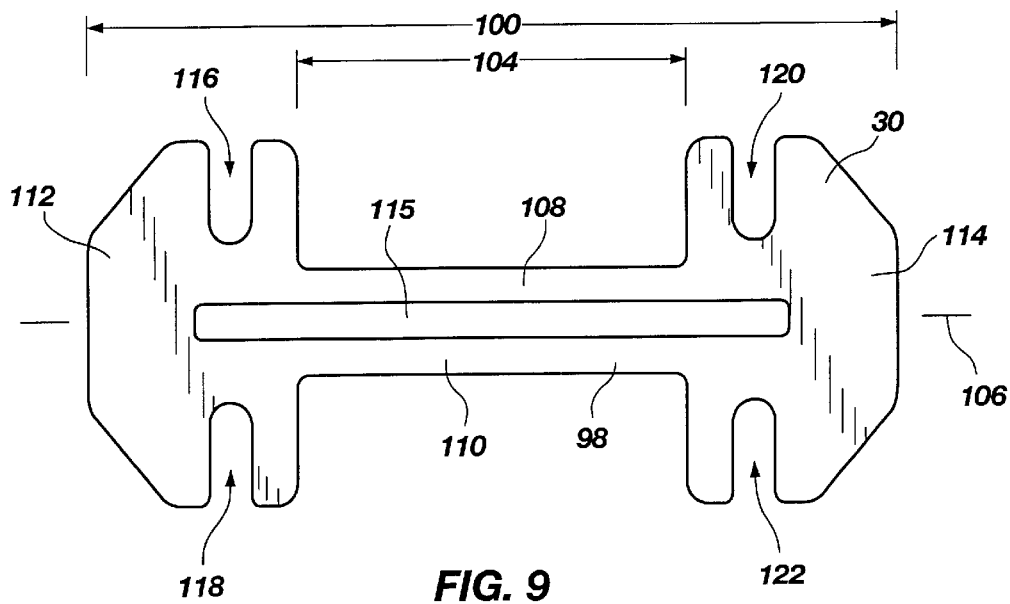
FIG. 9 is a plan view of the gland follower of the present invention illustrating that surface which is oriented away from the valve housing.

Referring to FIG. 9, the gland follower 30 is a ductile iron casting in the form of a generally flattened plate 98 which is sized in length 100 to be coextensive with the side-to-side dimensions 102 of the valve housing 38, as shown in FIG. 3. In the particular embodiment of the gland follower 30 shown in FIG. 9, a mid-portion 104 of the plate 98 is recessed on either side of and toward the center axis 106 of the plate 98, thereby providing narrow lands 108, 110 which span between a first end 112 and a second end 114 of the gland follower 30. A slot 115 is formed through the thickness of the gland follower 30, along the axis 106 of the plate 98, and is sized to slidably receive the gate of the valve therethrough.

The gland follower 30 is further configured in a manner which allows the gland follower 30 to be secured to the valve housing 38, and to thereby provide selective compression to the sealing member 22. Accordingly, the illustrated embodiment of the gland follower 30 is formed with two opposingly positioned U-shaped openings 116, 118 along the lateral sides of the first end 112 and two opposingly positioned U-shaped openings 120, 122 formed along the lateral sides of the second end 114. When the gland follower 30 is positioned over the sealing member 22 as shown in FIG. 1, the U-shaped openings 116, 118 of the first end 112 align with corresponding U-shaped openings 130, 132 located on the valve housing 38 (FIG. 3), which are formed by spaced lugs 138, 140 and 142, 144, respectively, which extend outwardly from the second valve body half 36 and first valve body half 34, respectively, of the valve housing 38.

Likewise, the U-shaped openings 120 and 122 of the second end 114 of the gland follower 30 align with corresponding U-shaped openings 148, 150 located on the valve housing 38, which are formed by spaced lugs 152, 154 and 156, 158, respectively, which extend outwardly from the second valve body half 36 and first valve body half 34, respectively, of the valve housing 38. As illustrated in FIG. 1, a bolt 160 is positioned through each pair of aligned U-shaped openings of the gland follower 30 and valve housing 38 as previously described. Each bolt 160 is held in place by an appropriate nut 162 and lock washer 164 positioned therebeneath. Tightening of the nut 162 will effect increased compression by the gland follower 30 on the sealing member 22.

In a particularly suitable embodiment of the invention shown in FIG. 1, the bolts 160 may be "live-loaded" by the employment of a compression spring 166 biased between a stabilizing ring 168, threaded on the bolt 160 and positioned adjacent the lock washer 164, and the gland follower 30. Additionally, a tension gauge member 170 may be employed to gauge the amount of tension on the compression spring 166. The tension gauge member 170 comprises a tubular guide which may be secured, such as by welding, to the gland follower 30. However, the tension gauge member 170 need not be secured to the gland follower 30. As the nut 162 is progressively tightened, the amount of tension on the compression spring 166 can be determined by the proximity of the stabilizing ring 168 to the tension gauge member 170. As illustrated in FIG. 1, the compression spring 166 is in full tension because the stabilizing ring 168 is in contact with the tension gauge member 170.

Figure 10:
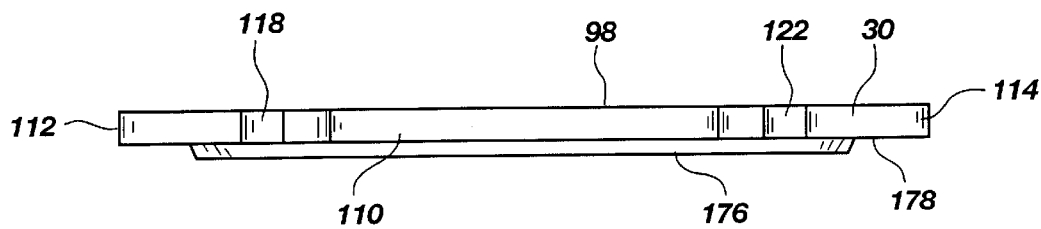
FIG. 10 is a view in elevation of a long side of the gland follower.
Figure 11:
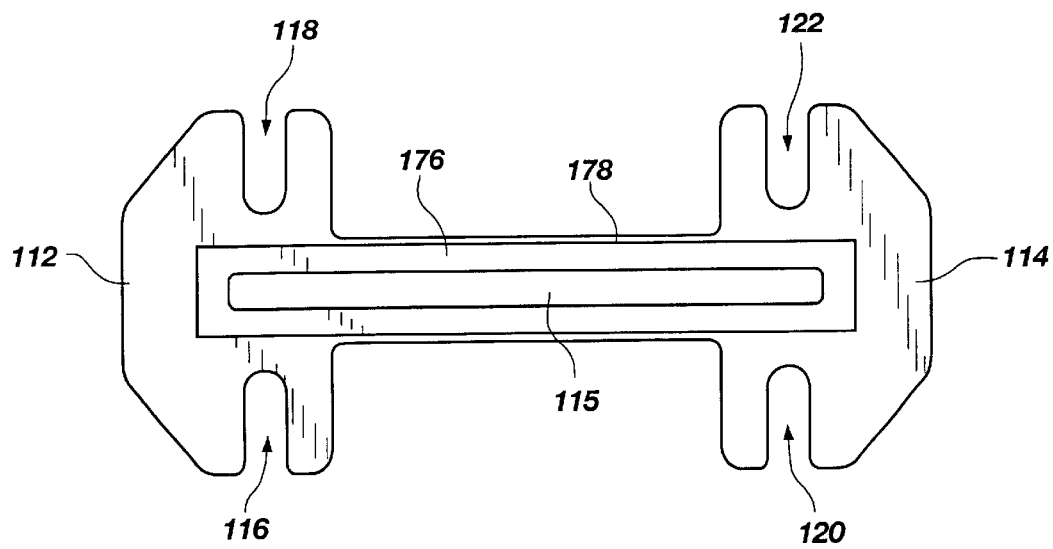
FIG. 11 is a plan view of the gland follower of the present invention illustrating that surface which is oriented toward the valve housing.

As further shown in FIGS. 10 and 11, the gland follower 30 may be configured with a compression surface 176 which extends away from the bottom surface 178 of the gland follower 30 and which surrounds the slot 115 formed through the gland follower 30. The compression surface 176 is oriented and sized to contact the upper surface 88 of the sealing member 22, and to particularly contact the sealing compound 90 retained within the sealing recess 86 to assure complete contact between the sealing compound 90 and the gate 26.

As shown in FIG. 1, a gasket 180, being rectangularly shaped and having a slot formed therethrough, may be positioned between the upper surface 88 of the sealing member 22 and the compression surface 176 of the gland follower 30 to provide additional sealing to the packing system of the present invention. The gasket 180 is an optional feature of the present invention.

It can be seen that the structure and configuration of the packing system of the present invention is advantageously designed to provide continuous contact between the packing material, sealing member and sealing compound as the gate cycles through repeated openings and closings, thereby assuring that the gate plate is properly and completely sealed at all times. The present invention can be adapted to virtually any of the numerous gate valve designs that exist in the art. Thus, it would be apparent to one of skill in the art that such adaptions can be made, and reference herein to details of the illustrated embodiments is made by way of example and are not meant to limit the scope of the invention, as defined by the claims.

What is claimed is:

1. A sealing member for a gate valve, comprising:

an elongated member having a selected thickness and a slot formed through said thickness sized to slidingly receive the gate plate of a gate valve;

an upper surface of said elongated member in which is formed a sealing recess positioned about said slot and being continuous therewith, said sealing recess being sized to receive a sealing compound therein;

a flange portion having a lower surface oriented in opposition to said upper surface;

an elongated insert surrounding said slot and extending away from said lower surface of said flange portion, said flange portion extending outwardly from said elongated insert; and a sealing channel formed in said lower surface of said flange portion to receive a sealing o-ring therein.

2. The sealing member of claim 1 wherein said elongated member, elongated insert and flange portion are made of non-metallic material.

3. The sealing member of claim 2 wherein said elongated member, elongated insert and flange portion are made of ultra-high molecular weight material.

4. A packing system for sealing the gate plate of a gate valve, comprising:

packing material positioned in a box cavity formed proximate the valve housing of a gate valve, said packing material being positioned to surround and contact the gate plate of a gate valve;

a sealing member configured with an insert to contact said packing material and to apply even and consistent pressure to said packing material about a gate plate;

a sealing recess formed in said sealing member to retain sealing compound therein in contact with the gate plate of a gate valve; and a compression member having a compression surface for positioning against said sealing member and said sealing recess to assure even application of pressure to said packing material.

5. The packing system of claim 4 wherein said sealing member further comprises a sealing channel for receiving an o-ring therein such that said o-ring is oriented to provide a seal between said packing material and the environment external to said sealing member.

6. The packing system of claim 4 further comprising a gasket configured to encircle the gate plate of a gate valve, said gasket being positioned between said sealing recess of said sealing member and said compression member.

7. A packing system for sealing the gate plate of a gate valve from leakage and fugitive emissions thereabout, comprising:

a packing box having a slot formed therein for slidably receiving a gate plate therethrough, said packing box providing a cavity into which an amount of packing material is positionable to contact and surround a gate plate positioned through said slot;

packing material positioned in said packing box;

a sealing member having an insert portion sized to be receivable in said packing box to contact and apply compression to said packing material within said packing box, said sealing member further having a slot formed therethrough and through said insert portion, and having a flange portion extending from said insert portion;

a sealing channel formed in said flange portion of said sealing member sized to receive an o-ring such that said o-ring is positioned to encircle said packing box and seal said packing material from the environment external to said packing box;

a sealing recess formed in said sealing member about said slot formed therethrough, said sealing recess being sized to retain sealing compound therein to contact and encircle a gate plate positioned through said slot in said sealing member; and a compression member having a slot formed therethrough sized to slidingly receive a gate plate therethrough, said compression member begin oriented to contact said sealing member to provide even application of pressure to said sealing member and thus said packing material when in contact with a gate plate positioned through said slot in said packing box.

8. The packing system of claim 7 wherein said compression member further comprises a compression surface oriented toward said sealing member to apply compressive force thereto.

9. The packing system of claim 7 further comprising a gasket configured to surround a gate plate positioned through said slot of said sealing member, said gasket being positioned between said compression member and said sealing member.

10. The packing system of claim 7 wherein said compression member is attached near said packing box by adjustable bolt members which provide selective compressive force to said sealing member.

11. The packing system of claim 10 wherein said compression member is live-loaded by the employment of compression springs positioned about said bolt members.

12. The packing system of claim 11 further comprising a tension gauge member positioned near said bolt members to determine the amount of tension on said compression springs.

* * * * *